US011348424B2

(12) United States Patent
Higley et al.

(10) Patent No.: US 11,348,424 B2
(45) Date of Patent: May 31, 2022

(54) METHOD TO NOTIFY A HOST THE CURRENT POSITION OF A VISITOR (71) Applicant: Carrier Corporation, Palm Beach Gardens, FL (US)

(72) Inventors: Jason Higley, Pittsford, NY (US); Wilmann Gomez, New Britain, CT (US); Dang Nguyen, Alpharetta, GA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/636,173

(22) PCT Filed: Aug. 14, 2018

(86) PCT No.: PCT/US2018/046676
§ 371 (c)(1),
(2) Date: Feb. 3, 2020

(87) PCT Pub. No.: WO2019/036452
PCT Pub. Date: Feb. 21, 2019

(65) Prior Publication Data
US 2020/0372773 A1 Nov. 26, 2020

Related U.S. Application Data (60) Provisional application No. 62/547,627, filed on Aug. 18, 2017.

(51) Int. Cl.
G08B 13/196 (2006.01)
H04W 4/029 (2018.01)
(Continued)

(52) U.S. Cl.
CPC . *G08B 13/19684* (2013.01); *G08B 13/19682* (2013.01); *G08B 21/22* (2013.01); *G08B 25/016* (2013.01); *H04W 4/029* (2018.02)

(58) Field of Classification Search
CPC ........ G08B 13/19684; G08B 13/19682; G08B 25/016; G08B 21/22; H04W 4/029
See application file for complete search history.

(56) References Cited

U.S. PATENT DOCUMENTS

2012/0253658 A1  10/2012  Kappeler et al.
2014/0229099 A1  8/2014  Garrett et al.
(Continued)

FOREIGN PATENT DOCUMENTS

WO     2016087478     6/2016

OTHER PUBLICATIONS

Notification of Transmittal of the International Search Report for International Application No. PCT/US2018/046676 dated Nov. 27, 2018; 9 pages.

(Continued)

*Primary Examiner* — Daryl C Pope
(74) *Attorney, Agent, or Firm* — Cantor Colburn LLP (57) ABSTRACT

A method of monitoring a visitor is provided. The method comprising: receiving a first current position of a visitor device; determining if a first triggering event has occurred in response to the first current position; determining a host device associated with the visitor device; determining a first mapped position of the visitor device in response to the first current position of the visitor device; and transmitting the first mapped position of the visitor device to the host device.

8 Claims, 2 Drawing Sheets

(51) Int. Cl.
    *G08B 21/22*     (2006.01)
    *G08B 25/01*     (2006.01)

(56) References Cited

U.S. PATENT DOCUMENTS

| 2014/0266726 | A1* | 9/2014 | Dalley, Jr. | G06Q 10/06 |
| | | | | 340/572.1 |
| 2017/0270565 | A1* | 9/2017 | Filatoff | G07C 9/20 |
| 2018/0139569 | A1* | 5/2018 | Padgett | G07C 9/27 |

OTHER PUBLICATIONS

Written Opinion of the International Searching Authority for International Application No. PCT/US2018/046676; dated Nov. 27, 2018; 14 pages.

* cited by examiner

FIG. 1

METHOD TO NOTIFY A HOST THE CURRENT POSITION OF A VISITOR

CROSS-REFERENCE TO RELATED APPLICATIONS

This application is a National Stage Application of International Application No. PCT/US2018/046676 filed Aug. 14, 2018, which claims the benefit of U.S. Provisional Application No. 62/547,627 filed Aug. 18, 2017, the disclosures of which are incorporated herein by reference in their entirety.

BACKGROUND

The subject matter disclosed herein generally relates to the field of visitor monitoring systems, and more particularly to an apparatus and method for tracking a visitor.

Existing visitor monitoring systems may store information identifying a visitor and detailing the visit of the visitor to a particular location but do little further to help coordinate the meeting of the visitor and a host of the visitor upon the arrival of the visitor. Valuable time is wasted by the host attempting to locate the visitor arrives.

BRIEF SUMMARY

According to one embodiment, a method of monitoring a visitor is provided. The method comprising: receiving a first current position of a visitor device; determining if a first triggering event has occurred in response to the first current position; determining a host device associated with the visitor device; determining a first mapped position of the visitor device in response to the first current position of the visitor device; and transmitting the first mapped position of the visitor device to the host device.

In addition to one or more of the features described above, or as an alternative, further embodiments may include: activating an alarm on the host device when the first mapped position is received.

In addition to one or more of the features described above, or as an alternative, further embodiments may include: receiving a second current position of the visitor device; determining if a second triggering event has occurred in response to the second current position; determining a second mapped position of the visitor device in response to the second current position of the visitor device; transmitting the second mapped position of the visitor device to the host device; and activating an alarm on the host device when the second mapped position is received.

In addition to one or more of the features described above, or as an alternative, further embodiments may include: determining a visitor destination in response to at least one of the first position and the second position; and transmitting the visitor destination to the host device.

In addition to one or more of the features described above, or as an alternative, further embodiments may include: determining a first path from the second current position to the visitor destination; determining a first arrival time of the visitor device at the visitor destination in response to the first path; and transmitting the first arrival time to the host device.

In addition to one or more of the features described above, or as an alternative, further embodiments may include: receiving a current position of the host device; determining a second path between the current position of the host device and the visitor destination; determining a second arrival time of the host device at the visitor destination in response to the second path; determining a departure time from the current position of the host device such that the second arrival time is equivalent to the first arrival time or prior to the first arrival time; and transmitting the departure time to the host device.

In addition to one or more of the features described above, or as an alternative, further embodiments may include: activating an alarm on the host device when a current time is equivalent to the departure time or later than the departure time.

According to another embodiment, a visitor notification is provided. The visitor notification system comprising: a processor; and a memory comprising computer-executable instructions that, when executed by the processor, cause the processor to perform operations, the operations comprising: receiving a first current position of a visitor device; determining if a first triggering event has occurred in response to the first current position; determining a host device associated with the visitor device; determining a first mapped position of the visitor device in response to the first current position of the visitor device; and transmitting the first mapped position of the visitor device to the host device.

In addition to one or more of the features described above, or as an alternative, further embodiments may include that the operations further comprise: activating an alarm on the host device when the first mapped position is received.

In addition to one or more of the features described above, or as an alternative, further embodiments may include that the operations further comprise: receiving a second current position of the visitor device; determining if a second triggering event has occurred in response to the second current position; determining a second mapped position of the visitor device in response to the second current position of the visitor device; transmitting the second mapped position of the visitor device to the host device; and activating an alarm on the host device when the second mapped position is received.

In addition to one or more of the features described above, or as an alternative, further embodiments may include that the operations further comprise: determining a visitor destination in response to at least one of the first position and the second position; and transmitting the visitor destination to the host device.

In addition to one or more of the features described above, or as an alternative, further embodiments may include that the operations further comprise: determining a first path from the second current position to the visitor destination; determining a first arrival time of the visitor device at the visitor destination in response to the first path; and transmitting the first arrival time to the host device.

In addition to one or more of the features described above, or as an alternative, further embodiments may include that the operations further comprise: receiving a current position of the host device; determining a second path between the current position of the host device and the visitor destination; determining a second arrival time of the host device at the visitor destination in response to the second path; determining a departure time from the current position of the host device such that the second arrival time is equivalent to the first arrival time or prior to the first arrival time; and transmitting the departure time to the host device.

In addition to one or more of the features described above, or as an alternative, further embodiments may include that the operations further comprise: activating an alarm on the host device when a current time is equivalent to the departure time or later than the departure time.

According to another embodiment, a computer program product tangibly embodied on a computer readable medium is provided. The computer program product including instructions that, when executed by a processor, cause the processor to perform operations comprising: receiving a first current position of a visitor device; determining if a first triggering event has occurred in response to the first current position; determining a host device associated with the visitor device; determining a first mapped position of the visitor device in response to the first current position of the visitor device; and transmitting the first mapped position of the visitor device to the host device.

In addition to one or more of the features described above, or as an alternative, further embodiments may include that the operations further comprise: activating an alarm on the host device when the first mapped position is received.

In addition to one or more of the features described above, or as an alternative, further embodiments may include that the operations further comprise: receiving a second current position of the visitor device; determining if a second triggering event has occurred in response to the second current position; determining a second mapped position of the visitor device in response to the second current position of the visitor device; transmitting the second mapped position of the visitor device to the host device; and activating an alarm on the host device when the second mapped position is received.

In addition to one or more of the features described above, or as an alternative, further embodiments may include that the operations further comprise: determining a visitor destination in response to at least one of the first position and the second position; and transmitting the visitor destination to the host device.

In addition to one or more of the features described above, or as an alternative, further embodiments may include that the operations further comprise: determining a first path from the second current position to the visitor destination; determining a first arrival time of the visitor device at the visitor destination in response to the first path; and transmitting the first arrival time to the host device.

In addition to one or more of the features described above, or as an alternative, further embodiments may include that the operations further comprise: receiving a current position of the host device; determining a second path between the current position of the host device and the visitor destination; determining a second arrival time of the host device at the visitor destination in response to the second path; determining a departure time from the current position of the host device such that the second arrival time is equivalent to the first arrival time or prior to the first arrival time; and transmitting the departure time to the host device.

In addition to one or more of the features described above, or as an alternative, further embodiments may include that the operations further comprise: activating an alarm on the host device when a current time is equivalent to the departure time or later than the departure time.

Technical effects of embodiments of the present disclosure include detecting the location of a visitor and notifying the host when a triggering event has occurred.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
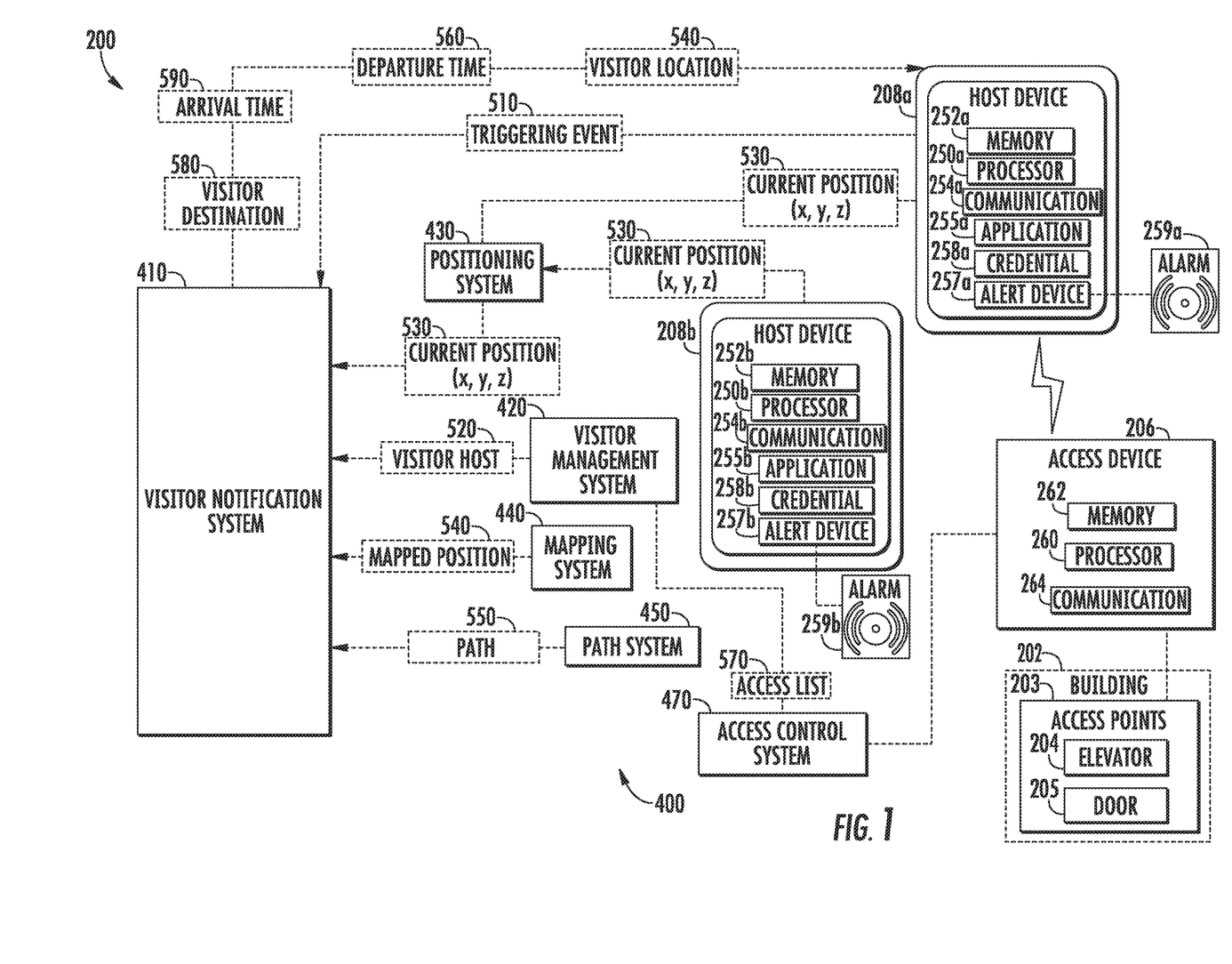
FIG. 1 illustrates a schematic view of a visitor monitoring system, in accordance with an embodiment of the disclosure.

FIG. 1 depicts a visitor monitoring system 200 in an example embodiment. The visitor monitoring system 200 includes a host device 208*a* and a visitor device 208*b*. The host device 208*a* and the visitor device 208*b* are capable of secure bi-directional communication with an access device 206, a plurality of interconnected systems 400, and each other.

The host device 208*a* may be a computing device such as a desktop computer. The host device 208*a* may also be a mobile computing device that is typically carried by a person, such as, for example a phone, PDA, smart watch, tablet, laptop, etc. The host device 208*a* may also be two separate devices that are synced together such as, for example, a cellular phone and a desktop computer synced over an internet connection. The host device 208*a* may include a processor 250*a*, memory 252*a* and communication module 254*a* as shown in FIG. 1. The processor 250*a* can be any type or combination of computer processors, such as a microprocessor, microcontroller, digital signal processor, application specific integrated circuit, programmable logic device, and/or field programmable gate array. The memory 252*a* is an example of a non-transitory computer readable storage medium tangibly embodied in the host device 208*a* including executable instructions stored therein, for instance, as firmware. The communication module 254*a* may implement one or more communication protocols as described in further detail herein. The host device 208*a* is configured to store a unique credential 258*a* that may be shared with the access device 206 and a plurality of interconnected systems 400, discussed further below. In a non-limiting example, the host device 208*a* may belong to an employee and/or resident of a building 202. The host device 208*a* may include an alert device 257*a* configured to activate an alarm 259*a*. In three non-limiting examples, the alert device 257*a* may be a vibration motor, audio speaker, and/or display screen. The alarm 259*a* may be audible, visual, haptic, and/or vibratory. The host device 208*a* may also include an application 255*a*. Embodiments disclosed herein, may operate through the application 255*a* installed on the host device 208*a*.

The visitor device 208*b* may be a computing device such as a desktop computer. The visitor device 208*b* may also be a mobile computing device that is typically carried by a person, such as, for example a phone, PDA, smart watch, tablet, laptop, etc. The visitor device 208*b* may also be two separate devices that are synced together such as, for example, a cellular phone and a desktop computer synced over an internet connection. The visitor device 208*b* may include a processor 250*b*, memory 252*b* and communication module 254*b* as shown in FIG. 1. The processor 250*b* can be any type or combination of computer processors, such as a microprocessor, microcontroller, digital signal processor, application specific integrated circuit, programmable logic device, and/or field programmable gate array. The memory 252*b* is an example of a non-transitory computer readable storage medium tangibly embodied in the visitor device 208*b* including executable instructions stored therein, for instance, as firmware. The communication module 254*b* may implement one or more communication protocols as described in further detail herein. The visitor device 208*b* is configured to store a unique credential 258*b* that may be shared with the access device 206 and a plurality of interconnected systems 400, discussed further below. In a non-limiting example, the visitor device 208*b* may belong to a visitor of the building 202. The visitor device 208*b* may include an alert device 257*b* configured to activate an alarm 259*b*. In three non-limiting examples, the alert device 257*b* may be a vibration motor, audio speaker, and/or display screen. The alarm 259*b* may be audible, visual, haptic, and/or vibratory. The visitor device 208*b* may also include an application 255*b*. Embodiments disclosed herein, may operate through the application 255*b* installed on the visitor device 208*b*.

As shown in FIG. 1, the visitor monitoring system 200 also includes a plurality of interconnected systems 400 including: a positioning system 430, a visitor management system 420, a path system 450, a mapping system 440, an access control system 470, and a visitor notification system 410. In the illustration of FIG. 1, the interconnected systems 400 are illustrated as separate systems. In an embodiment, at least one of the positioning system 430, the visitor management system 420, the path system 450, the mapping system 440, the access control system 470, and the visitor notification system 410 may be combined into a single system. In another embodiment, at least one of the positioning system 430, the visitor management system 420, the path system 450, the mapping system 440, the access control system 470, and the visitor notification system 410 is within the host device 208*a*. In another embodiment, at least one of the positioning system 430, the visitor management system 420, the path system 450, the mapping system 440, the access control system 470, and the visitor notification system 410 is within the visitor device 208*b*.

The interconnected systems 400 may each include a processor, memory, and communication module. For ease of illustration, the processor, memory, and communication module are not shown in FIG. 1. The processor can be any type or combination of computer processors, such as a microprocessor, microcontroller, digital signal processor, application specific integrated circuit, programmable logic device, and/or field programmable gate array. The memory is an example of a non-transitory computer readable storage medium tangibly embodied in or operably connected to the path determination system including executable instructions stored therein, for instance, as firmware. The communication module may implement one or more communication protocols as described in further detail herein.

The visitor notification system 410 is configured to notify a host through an application 255*a* on a host device 208*a* that a visitor scheduled to visit has induced a triggering event 510. In a few non-limiting events, the triggering event 510 may be the visitor driving into the parking lot, the visitor parking his/her car, the visitor beginning to walk from his/her car to a building entrance, and/or the visitor arriving at the building entrance. The host may establish one or more triggering events 510 in the visitor notification system 410.

The triggering events 510 may be established through an application 255*a* on a host device 208*a*. A triggering event 510 may be induced by a current position 530 of visitor device 208*b* detected by the positioning system 430. The visitor notification system 410 is configured to determine a visitor destination 580 in response to at least one triggering event 510. For instance, the visitor may have parked near the lobby of a building 200, thus the visitor destination 580 may be determined to be the lobby.

The positioning system 430 is configured to determine the current position 530 of the host device 208*a* and/or the visitor devices 208*b*. The current position 530 includes the (x, y, z) coordinates of the host device 208*a* and the visitor devices 208*b* on a map. The (x, y, z) coordinates may translate to a latitude, a longitude, and a height. The positioning system 430 may use various methods in order to determine the current position 530 such as, for example, GPS, Bluetooth triangulation, Wi-Fi triangulation, cellular signal triangulation, or any other location determination method known to one of skill in the art. The positioning system 430 is configured to transmit the current position 530 to the visitor notification system 410. The visitor notification system 410 is configured to receive the current position 530 from the positioning system 430 and store each current position 530 received.

The mapping system 440 is configured to store the (x, y, z) coordinates of mapped positions 540 and map the current position 530 to the mapped position 540. The mapped position 540 may be inside and outside the building 200, such as, for example, parking lot A, meeting room A, gate A, guard booth A, door A, lobby A, and visitor receiving area A. The mapping system 440 is configured to determine a mapped position 540 in response to the current position 530. The mapping system 440 transmits the mapped position 540 to the visitor notification system 410 and onto the host device 208*a*.

The path system 450 is configured to determine a list of paths 550 in response to a current position 530 of the host device 208*a* and the visitor destination 580. The path system 450 is also configured to determine a list of paths 550 in response to a current position 530 of the visitor device 208*b* and the visitor destination 580. The paths 550 may include information to describe the route a user of a host device 208*a* may take from a first position (ex: current position 530) to a second position (ex: visitor destination 580). In a non-limiting example, the paths 550 may include the hallways one may traverse, the elevators 204 one may take, the doors 205 one may goes through, and the turnstiles one may go through to get from a first position to a second position. The first position may be a current position 530 of a host device 208*a* and the second position may be a visitor destination 580.

The visitor management system 420 may store details regarding each visitor scheduled to visit a building 200 or site. The visit details may include but is not limited to the visitor's name, citizenship, date of visit, time of visit, and host of the visitor. A host using an application 255*a* on the host device 208*a* may schedule the visit through the visitor management system 420 and/or the visitor using an application 255*b* on the visitor device 208*b* may schedule the visit through the visitor management system 420. An access list 570 may also be submitted through the visitor management system 420 to the access control system 470. The access list 570 may a list of access device 206 that the visitor may need access to during their visit. The access list 570 may be associated with the credential 258*b* of the visitor device 208*b*. The access control system 470 is configured to control and store an access list 550 that includes the access device 206 to which each credential 258a, 258b has been granted access. The access control system 470 is in electronic communication with each access device 206.

The visitor monitoring system 200 includes at least one access device 206 to grant/deny access to access points 203, such as for example an elevator 204 or a door 205. The access device 206 grant/deny access to access points 203 by adjusting the access point 203, such as, for example, unlocking a door lock or opening an elevator door. The access points 203 may be installed at a building 202. In some embodiments, the building 202 may be a building or a collection of buildings that may or may not be physically located near each other. The building 202 may include any number of floors. Persons entering the building 202 may enter at a lobby floor, or any other floor, and may go to a destination floor via one or more conveyance devices, such as the elevator 204. Persons entering the building 202 may be required to enter a door 205. In another non-limiting embodiment, the door 205 may be outside of a building, such as, for example a car door. The door 205 may include but is not limited to a door in a wall of the building 202, a door on the outside of the building 202, a garage door, a parking lot access gate, a turnstile, a car door, or similar access point known to one of skill in the art.

The access points 203 may be operably connected to one or more access devices 206. The access device 206 may be configured to control access to the access points 203, such as, for example an elevator 204 and a door 205. Although only one elevator 204 is shown in FIG. 1, it is understood that any number of elevators 204 may be used in the visitor monitoring system 200. It is understood that other components of the elevator 204 (e.g., elevator car, doors, drive, counterweight, safeties, etc.) are not depicted for ease of illustration. It is also understood that each elevator 204 may utilize one or more access devices 206. In an example, there may be an access device 206 located on each floor of the building 202 located proximate an elevator shaft. Further, although only one door 205 is shown in FIG. 1, it is understood that any number of doors 205 may be used in the visitor 200. It is understood that other components of doors 205 are not depicted for ease of illustration (e.g., locks). It is also understood that each door 205 may utilize one or more access devices 206.

In a non-limiting example, the access device 206 may be a door reader or door strike. The access device 206 may include a processor 260, memory 262 and communication module 264 as shown in FIG. 1. The processor 260 can be any type or combination of computer processors, such as a microprocessor, microcontroller, digital signal processor, application specific integrated circuit, programmable logic device, and/or field programmable gate array. The memory 262 is an example of a non-transitory computer readable storage medium tangibly embodied in the access device 206 including executable instructions stored therein, for instance, as firmware. The memory 262 may store a unique device ID for each access device 206. The memory 262 may also store a set of geo-location information for each access device 206. The host device 208a and the visitor device 208b may actuate an access device 206 when within a selected range of the access device 206. The communication module 264 allows for secure bi-directional communication wirelessly with the host device 208a and the visitor device 208b. The communication module 264 may implement one or more communication protocols as described in further detail herein.

The host device 208 and the visitor device 208b communicate with the access device 206, the interconnected systems 400, and with each other. The communication may occur over a wireless network, such as 802.11x (Wi-Fi), short-range radio (Bluetooth), cellular, satellite, etc. In some embodiments, an interconnected system 400 and the access device 206 may include, or be associated with (e.g., communicatively coupled to) a networked system, such as kiosk, beacon, lantern, bridge, router, network node, building intercom system, etc. The networked system may communicate with the host device 208 and the visitor device 208b using one or more communication protocols or standards. For example, the networked system may communicate with the host device 208 and the visitor device 208b using near field communications (NFC). In an embodiment, the host device 208 and the visitor device 208b may communicated with an access device 206 through a networked system. In other embodiments, the host device 208 and the visitor device 208b may establish communication with an interconnected system 400 or an access device 206 that is not associated with a networked system in the building 202. This connection may be established with various technologies including GPS, 802.11x (Wi-Fi), cellular, or satellite, by way of non-limiting example. In example embodiments, the host device 208 and the visitor device 208b communicate over multiple independent wired and/or wireless networks. Embodiments are intended to cover a wide variety of types of communication between the host device 208a, the visitor device 208b, the access device 206, and the interconnected systems 400, thus embodiments are not limited to the examples provided in this disclosure.

Figure 2:
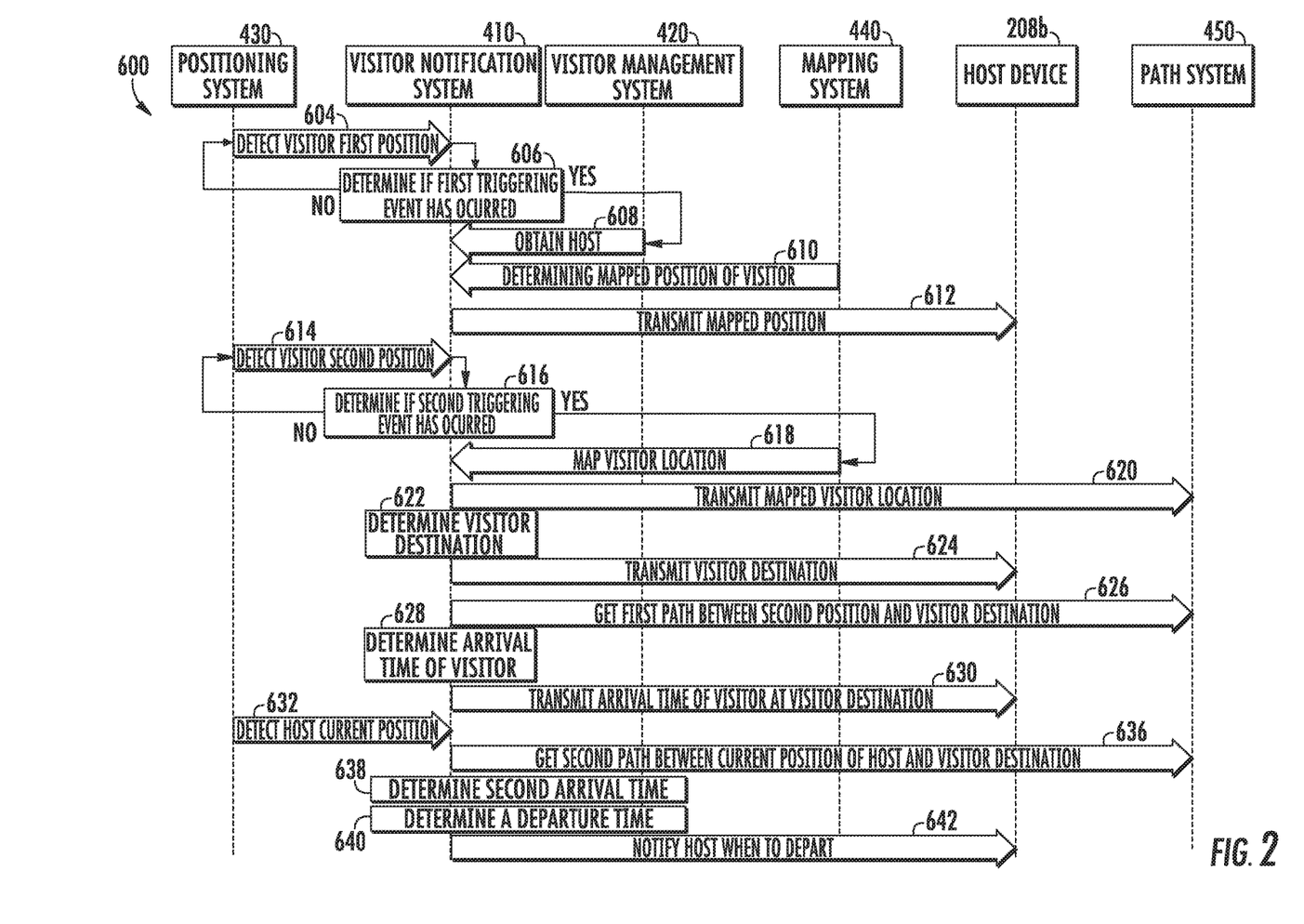
FIG. 2 is a flow diagram illustrating a method of monitoring a visitor, according to an embodiment of the present disclosure.

Referring now to FIG. 2, while referencing components of FIG. 1. FIG. 2 shows a flow chart of method 600 of method of monitoring a visitor, in accordance with an embodiment of the disclosure. At block 604, a first current position 530 of the visitor device 208b is detected by the positioning system 430, transmitted to the visitor notification system 410, and received by the visitor notification system 410. At block 606, the visitor notification system 410 determines if a first triggering event 510 has occurred in response to the first current position 530. In a non-limiting example, the first triggering event 510 may be the visitor device 208b entering a parking lot. If the first triggering event 510 has not occurred at block 606 then the method 600 will loop back to block 604. If the first triggering event 510 has occurred at block 606 then the method 600 will move on to block 608.

At block 608, a host device 208a associated with the visitor device 208b is determined when the first triggering event 510 has occurred. In order to determine the host device 208a associated with the visitor device 208b, the visitor notification system 410 may contact the visitor management system 420, as seen in FIG. 2. The host associated with the visitor may be stored in the visitor management system. The host may be linked to a host device 208a by a credential 258a and the visitor may be linked to a visitor device 208b by a credential 258b.

At block 610, a first mapped position 540 of the visitor device 208b is determined in response to the first current position 530 of the visitor device 208b. In order to determine the first mapped position 540 of the visitor device 208b, the visitor notification system 410 may contact the mapping system 440. The first mapped position 540 is a location name associated with an (x, y, z) coordinate of a current position 530. For example, the first mapped position 540 may state that the visitor is in "Parking Lot A". At block 612, the first mapped position 540 of the visitor device 208a is transmitted to the host device 208a. An alarm 259a on the host device 208a when the first mapped position 540 is received.

At block 614, a second current position 530 of the visitor device 208b is detected by the positioning system 430, transmitted to the visitor notification system 410, and received by the visitor notification system 410. At block 616, the visitor notification system 410 determines if a second triggering event 510 has occurred in response to the second current position 530. In a non-limiting example, the second triggering event 510 may be the visitor device 208b parking their car in the parking lot. If the second triggering event 510 has not occurred at block 616 then the method 600 will loop back to block 614. If the second triggering event 510 has occurred at block 616 then the method 600 will move on to block 618.

At block 618, a second mapped position 540 of the visitor device 208b is determined in response to the second current position 530 of the visitor device 208b. The second mapped position 540 may be determined by the visitor notification system 410 contacting the mapping system 440. At block 620, the second mapped position 540 of the visitor device 208b is transmitted to the host device 208a. An alarm 258a on the host device 208a may be activated when the second mapped position 540 is received.

At block 622, a visitor destination 580 is determined in response to at least one of the first position 530 and the second position 530. The visitor destination 580 is where the visitor is likely to go in order to meet the host. The visitor destination 580 may be listed in a scheduling system and/or the visitor destination may be predicted by the visitor notification system 400 in response to at least one of the first position 530 and the second position 530. At block 624, the visitor destination 580 is transmitted to the host device 208a. An alarm 258a on the host device 208a may be activated when the visitor destination 580 is received.

At block 626, a first path 550 from the second current position 530 to the visitor destination 580 is determined. The first path 550 may be determined by the path system 450. At block 628, a first arrival time 590 of the visitor device 208b at the visitor destination 580 is determined in response to the first path 550. The first arrival time 590 may be determined by the visitor notification system 410. At block 630, the first arrival time 590 is transmitted to the host device 208a. An alarm 258a on the host device 208a may be activated when the first arrival time 590 is received.

At block 632, a current position 530 of the host device 208a is detected by the positioning system 430, transmitted to the visitor notification system 410, and received by the visitor notification system 410. At block 636, a second path 550 between the current position 530 of the host device 208a and the visitor destination 580 is determined. The second path 550 may be determined by the path system 450. At block 638, a second arrival time 590 of the host device 208a at the visitor destination 580 is determined in response to the second path 550. The second arrival time 590 may be determined by the visitor notification system 410. At block 640, a departure time 560 from the current position 530 of the host device 208a is determined such that the second arrival time 590 is equivalent to the first arrival time 590 or prior to the first arrival time 590. The departure time 560 may be determined by the visitor notification system 410. At block 642, the departure time 560 is transmitted to the host device 208a. An alarm 258a on the host device 208a may be activated when the departure time 560 is received. An alarm 259a may also be activated on the host device 208a when a current time is equivalent to the departure time 560 or later than the departure time 560.

While the above description has described the flow process of FIG. 2 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of monitoring a visitor, the method comprising:
receiving a first detected current position of a visitor phone detected via at least one of GPS, Bluetooth triangulation, Wi-Fi triangulation, or cellular triangulation, the visitor phone belonging to a first individual that is visiting a location;
determining if a first triggering event has occurred in response to the first detected current position;

determining a host phone associated with the visitor phone, the host phone belonging to a second individual that is hosting the first individual that is visiting the location, the visitor phone being a different phone than the host phone;
determining a first mapped position of the visitor phone in response to the first detected current position of the visitor phone;
transmitting the first mapped position of the visitor phone to the host phone;
receiving a second detected current position of the visitor phone detected via at least one of the GPS, the Bluetooth triangulation, the Wi-Fi triangulation, or the cellular triangulation;
determining if a second triggering event has occurred in response to the second detected current position;
determining a second mapped position of the visitor phone in response to the second detected current position of the visitor phone;
transmitting the second mapped position of the visitor phone to the host phone; and
activating an alarm on the host phone when the second mapped position is received,
determining a visitor destination in response to at least one of the first detected current position and the second detected current position;
transmitting the visitor destination to the host phone;
determining a first path from the second detected current position to the visitor destination;
determining a first arrival time of the visitor phone at the visitor destination in response to the first path;
transmitting the first arrival time to the host phone;
receiving a detected current position of the host phone detected via at least one of the GPS, the Bluetooth triangulation, the Wi-Fi triangulation, or the cellular triangulation;
determining a second path between the detected current position of the host phone and the visitor destination;
determining a second arrival time of the host phone at the visitor destination in response to the second path;
determining a departure time from the detected current position of the host phone such that the second arrival time is equivalent to the first arrival time or prior to the first arrival time; and
transmitting the departure time to the host phone,
wherein the method is performed by a visitor notification system.

2. The method of claim 1, further comprising:
activating an alarm on the host phone when the first mapped position is received.

3. The method of claim 1, further comprising:
activating an alarm on the host phone when a current time is equivalent to the departure time or later than the departure time.

4. A visitor notification system comprising:
a processor; and
a memory comprising computer-executable instructions that, when executed by the processor, cause the processor to perform operations, the operations comprising:
receiving a first detected current position of a visitor phone detected via at least one of the GPS, the Bluetooth triangulation, the Wi-Fi triangulation, or the cellular triangulation, the visitor phone belonging to a first individual that is visiting a location;
determining if a first triggering event has occurred in response to the first detected current position;
determining a host phone associated with the visitor phone, the host phone belonging to a second individual that is hosting the first individual that is visiting the location, the visitor phone being a different phone than the host phone;
determining a first mapped position of the visitor phone in response to the first detected current position of the visitor phone;
transmitting the first mapped position of the visitor phone to the host phone;
receiving a second detected current position of the visitor phone detected via at least one of the GPS, the Bluetooth triangulation, the Wi-Fi triangulation, or the cellular triangulation;
determining if a second triggering event has occurred in response to the second detected current position;
determining a second mapped position of the visitor phone in response to the second detected current position of the visitor phone;
transmitting the second mapped position of the visitor phone to the host phone; and
activating an alarm on the host phone when the second mapped position is received,
determining a visitor destination in response to at least one of the first detected current position and the second detected current position;
transmitting the visitor destination to the host phone;
determining a first path from the second detected current position to the visitor destination;
determining a first arrival time of the visitor phone at the visitor destination in response to the first path;
transmitting the first arrival time to the host phone;
receiving a detected current position of the host phone detected via at least one of the GPS, the Bluetooth triangulation, the Wi-Fi triangulation, or the cellular triangulation;
determining a second path between the detected current position of the host phone and the visitor destination;
determining a second arrival time of the host phone at the visitor destination in response to the second path;
determining a departure time from the detected current position of the host phone such that the second arrival time is equivalent to the first arrival time or prior to the first arrival time; and
transmitting the departure time to the host phone.

5. The visitor notification system of claim 4, wherein the operations further comprise:
activating an alarm on the host phone when the first mapped position is received.

6. The visitor notification system of claim 4, wherein the operations further comprise:
activating an alarm on the host phone when a current time is equivalent to the departure time or later than the departure time.

7. A computer program product tangibly embodied on a non-transitory computer readable medium, the computer program product including instructions that, when executed by a processor, cause the processor to perform operations comprising:
receiving a first detected current position of a visitor phone detected via at least one of the GPS, the Bluetooth triangulation, the Wi-Fi triangulation, or the cellular triangulation, the visitor phone belonging to a first individual that is visiting a location;
determining if a first triggering event has occurred in response to the first detected current position;

determining a host phone associated with the visitor phone, the host phone belonging to a second individual that is hosting the first individual that is visiting the location, the visitor phone being a different phone than the host phone;

determining a first mapped position of the visitor phone in response to the first detected current position of the visitor phone;

transmitting the first mapped position of the visitor phone to the host phone;

receiving a second detected current position of the visitor phone detected via at least one of the GPS, the Bluetooth triangulation, the Wi-Fi triangulation, or the cellular triangulation;

determining if a second triggering event has occurred in response to the second detected current position;

determining a second mapped position of the visitor phone in response to the second detected current position of the visitor phone;

transmitting the second mapped position of the visitor phone to the host phone; and activating an alarm on the host phone when the second mapped position is received, determining a visitor destination in response to at least one of the first detected current position and the second detected current position;

transmitting the visitor destination to the host phone;

determining a first path from the second detected current position to the visitor destination;

determining a first arrival time of the visitor phone at the visitor destination in response to the first path;

transmitting the first arrival time to the host phone;

receiving a detected current position of the host phone detected via at least one of the GPS, the Bluetooth triangulation, the Wi-Fi triangulation, or the cellular triangulation;

determining a second path between the detected current position of the host phone and the visitor destination;

determining a second arrival time of the host phone at the visitor destination in response to the second path;

determining a departure time from the detected current position of the host phone such that the second arrival time is equivalent to the first arrival time or prior to the first arrival time; and transmitting the departure time to the host phone.

8. The computer program product of claim 7, wherein the operations further comprise:

activating an alarm on the host phone when the first mapped position is received.

\* \* \* \* \*